P. O. SWEDBERG.
AUTOMOBILE SIGNAL DEVICE.
APPLICATION FILED NOV. 6, 1916.
1,240,899.
Patented Sept. 25, 1917.
2 SHEETS—SHEET 1.
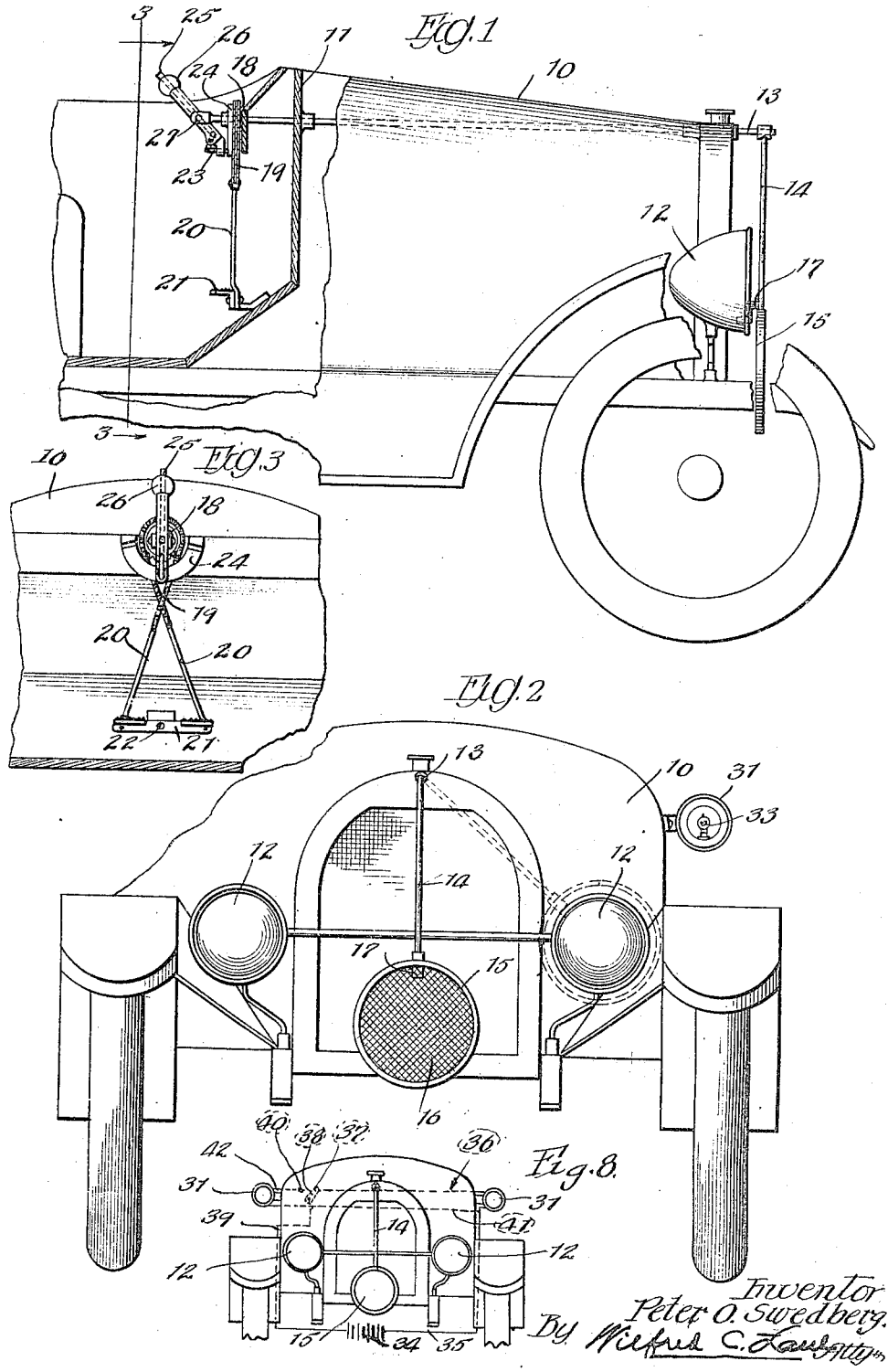
Inventor
Peter O. Swedberg.
By Wilfred C. Laughty P. O. SWEDBERG.
AUTOMOBILE SIGNAL DEVICE.
APPLICATION FILED NOV. 6, 1916.
1,240,899.
Patented Sept. 25, 1917.
2 SHEETS—SHEET 2.
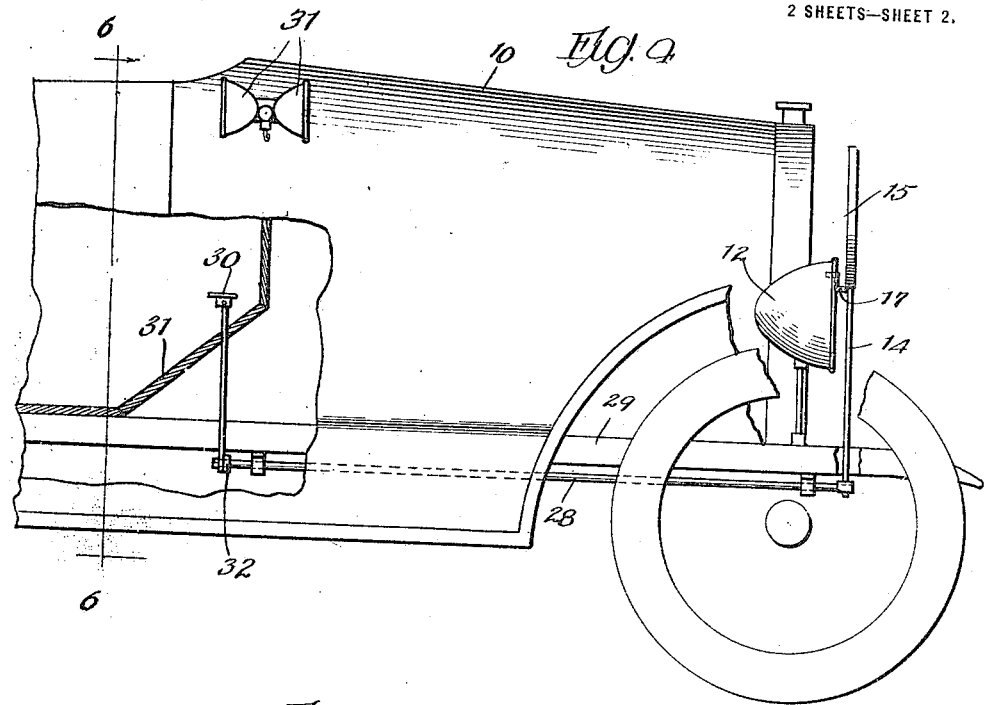
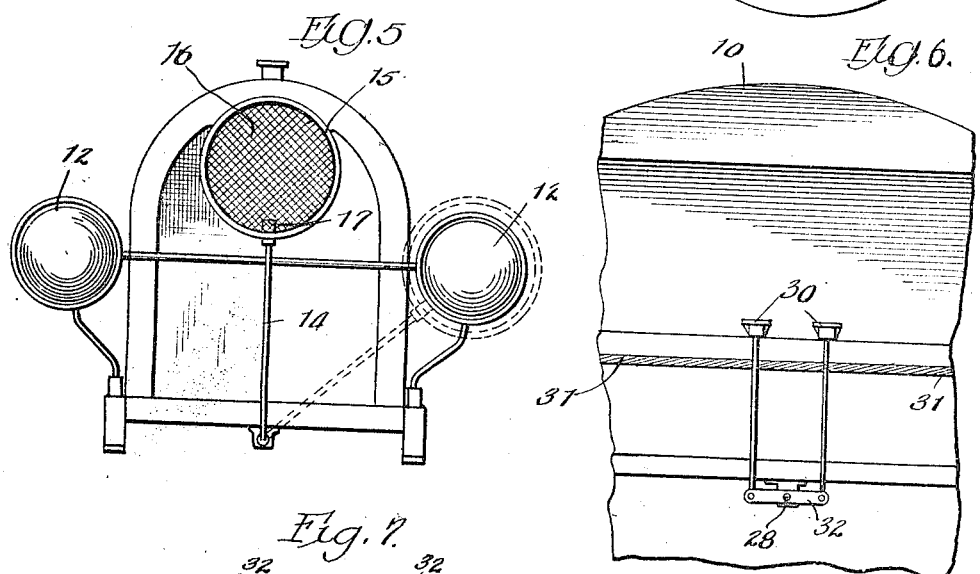
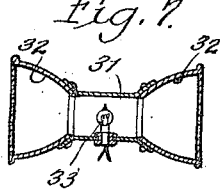
Inventor.
Peter O. Swedberg.
By Wilfred C. Lane
Atty.

UNITED STATES PATENT OFFICE.

PETER O. SWEDBERG, OF MARSHALLTOWN, IOWA, ASSIGNOR OF ONE-HALF TO S. H. REILLY, OF MARSHALLTOWN, IOWA.

AUTOMOBILE SIGNAL DEVICE.

1,240,899.

Specification of Letters Patent.   Patented Sept. 25, 1917.

Application filed November 6, 1916.   Serial No. 129,866.

*To all whom it may concern:*

Be it known that I, PETER O. SWEDBERG, a citizen of the United States, residing at Marshalltown, in the county of Marshall and State of Iowa, have invented certain new and useful Improvements in Automobile Signal Devices, of which the following is a specification.

This invention relates to improvements in automobile signal devices, and one of the objects of the same is to provide an improved device of this character for indicating in which direction the operator intends turning the machine, and which device embodies a colored signal arranged adjacent the front of the engine hood, and adapted to be shifted to position the same in front of one or the other of the head lights.

A further object is to provide improved means whereby the signal may be actuated at will from the vehicle, and having means for retaining the signal in its adjusted position.

A further object is to provide an improved signal, which may be readily seen from in front of or from behind the vehicle.

Other and further objects will appear from the following specification and claims when taken in connection with the accompanying drawings and in which—

Figure 1 is a view partly in side elevation and partly in section of a portion of an automobile having a signal device attached thereto, constructed in accordance with the principles of this invention.

Fig. 2 is a view as taken from the right hand end of the parts shown in Fig. 1.

Fig. 3 is a view as taken on line 3—3, Fig. 1.

Fig. 4 is a view similar to Fig. 1 of a modified form of the invention.

Fig. 5 is a view as taken from the right hand end of Fig. 4.

Fig. 6 is a view as taken on line 6—6, Fig. 4.

Fig. 7 is a detail sectional view of one of the signal lights.

Fig. 8 is a diagrammatic view showing the wiring.

Referring more particularly to the drawings, the numeral 10 designates generally the hood of an automobile and 11 is the dash board. The headlights 12 are arranged at the front of the hood in the usual manner and are adapted to coöperate with the signal device for indicating the direction in which the operator intends turning the vehicle.

In the form of the invention shown in Figs. 1 to 3, there is provided a shaft 13 which is mounted in suitable bearings, so that the shaft will preferably extend along the top of the hood. The shaft projects beyond the front of the hood a suitable distance and connected with this extremity is an arm 14, and connected to the arm is a signal device 15, which may be of any desired size and configuration and constructed of any suitable material and is provided with a transparent body portion 16. The arm is of such a length that when the shaft 13 is rocked in a manner to be hereinafter set forth, the transparent body portion 16 is adapted to be positioned in front of either one or the other of the lamps 12, and a stop device in the form of a projection 17 may be provided to swing with the signal, and operates to arrest the movement of the signal in one direction of its movement with respect to the lamps. This stop is preferably adapted to engage the frame of the lamp.

The shaft 13 may be rocked in any suitable manner either by means of the foot or the hand of the operator. If the former, there is provided a pulley 18 which is connected with the shaft 13 and over this pulley a flexible member 19 passes. The ends of this flexible member are connected in any suitable manner such as by means of rods 20 to a treadle 21, the latter preferably being pivoted intermediate its ends as at 22 to a fixed support, so that the operator may engage either one or the other ends of the treadle beyond the pivot to rock the treadle which will rotate the pulley 18 and correspondingly rotate the shaft 13.

In order to retain the signal in its adjusted position, a suitable locking device may be provided such as a catch 23 which coöperates with a segment 24, and the catch is connected with a releasing device 25 which latter is connected with an actuating handle 26. This actuating handle is also connected as at 27 with the shaft 13, so that when the catch 23 is released, the operator may swing the signal 15 by either actuating the treadle 21 or the handle 26 and the catch 23 will retain the signal in either an intermediate position as shown in Fig. 2 or in front of either one or the other of the lights 12.

In the form of the invention shown in Figs. 4 to 6, the shaft 28 is shown as being rotatably supported beneath the chassis 29 and the signal 15 is connected at the forward end of the shaft 28. In this form of the invention, the arm 14 extends upwardly and foot treadles 30 are arranged in a convenient position for the operator so as to extend through the floor 31 of the vehicle. These treadles 30 are connected to a rock arm 32 which is connected with the shaft 28 so that when one or the other of the treadles 30 is actuated, the arm 32 will be rocked and the signal 15 will be correspondingly shifted.

With this improved construction it will be manifest that the operator in order to signal to the approaching vehicle as to which direction he intends to turn the vehicle need only actuate the signal, the body of which may be of any desired color so as to shift the signal over one or the other of the lights, according to the direction that he intends to turn.

A supplemental light 31 may be provided on each side of the machine preferably adjacent the wind shield and in a position to be seen from the front of the machine as well as from behind. The light is a double light, that is, it is provided with spaced reflectors 32 with a single lamp 33 therebetween so that when the lamp is lighted it will be seen from in front as well as from behind the machine.

A battery 34 supplies the current through the conductor 35 through one of the lights 31 to the conductor 36, thence to the contact 37, switch 38, conductor 39, back to the battery. When the switch 38 is shifted to engage the contact 40 the first light 31 will be cut out and the circuit will be completed in the second light 31, from the battery 34 through conductor 35, branch conductor 41, second light 31, conductor 42, contact 40, switch 38, conductor 39, back to the battery 34. Thus by manipulating the switch 38, either one or the other of the lights 31 will be lighted to signal in front and to the rear of the machine, and the lights 12 and signal 16, coöperate therewith for signaling at a greater distance, owing to the fact that the lights 12 are much larger than the lights 31.

While the preferred forms of the invention have been herein shown and described, it is to be understood that various changes may be made in the details of construction and in the combination and arrangement of the several parts, without departing from the spirit of this invention.

What is claimed as new is:

1. In an automobile signal device, the combination of laterally spaced lights each having a casing, a transparent signal swingingly mounted intermediate the lights and adapted to be swung into a position in front of either of the lights, a stop device connected with the signal for limiting its movement in one direction, and actuating means located in a convenient position for the driver for swinging the signal, said stop device embodying a projection connected with the said swinging signal and adapted to contact with the frame of either of the lights.

2. In an automobile signal device, the combination of laterally spaced lights, a transparent signal swingingly mounted intermediate the lights and adapted to be swung into a position in front of either of the lights, a stop device connected with the signal for limiting its movement in one direction, and actuating means located in a convenient position for the driver for swinging the signal, said actuating means embodying a foot treadle, a pulley connected with the signal, and a flexible element passing over the pulley to rotate the same to actuate the signal, said flexible element having connections with the treadle.

3. In an automobile signal device, the combination of laterally spaced lights, a transparent signal swingingly mounted intermediate the lights and adapted to be swung into a position in front of either of the lights, actuating means located in a convenient position for the driver for swinging the signal, said actuating means embodying a foot treadle, a pulley connected with the signal, and a flexible element passing over the pulley to rotate the same to actuate the signal, said flexible element having connections with the treadle, and a locking device for locking the signal in its adjusted position.

4. In an automobile signal device, the combination of laterally spaced lights each having a casing, a transparent signal swingingly mounted intermediate the lights and adapted to be swung into position in front of either of the lights, a stop device connected with the signal for limiting its movement in one direction, said stop device embodying a projection connected with the signal and adapted to contact with the casing of either of the lights, actuating means located in a convenient position for the driver for swinging the signal, and means for retaining the signal in its adjusted position, the last recited means embodying a catch, and means for controlling the catch.

In witness whereof, I hereunto subscribe my name to this specification in the presence of two witnesses:

PETER O. SWEDBERG.

Witnesses:
   Chas. Henry,
   R. G. Goodale.